UNITED STATES PATENT OFFICE.

ISAAC HELLMAN, OF ST. LOUIS, MISSOURI.

IMPROVED TONIC BITTERS.

Specification forming part of Letters Patent No. 47,204, dated April 11, 1865.

*To all whom it may concern:*

Be it known that I, ISAAC HELLMAN, of the city and county of St. Louis, and State of Missouri, have invented a new combination of materials, which, in their combined capacity, constitute a tonic bitters for the use of dyspeptics and other invalids, and I designate the said bitters as "Congress Bitters;" and I do hereby declare that the following is a full, clear, and exact description thereof, reference being had to the accompanying ingredients, and to the compound itself, which is made to form part of this specification.

To enable those skilled in the art to make and use my Congress Bitters, I will proceed to describe the proportions in which I unite the several ingredients to form the compound.

I take of cologne spirits, 69.53 per cent., by weight; sugar sirup, ten per cent., by weight pure rain water, twenty per cent., by weight orange-peel, .16 per cent., by weight; mace .08 per cent., by weight; cinnamon, .07 pe cent., by weight; calamus-root, .06 per cent. by weight; cloves, .04 per cent., by weight galanga-root, .02 per cent., by weight; anise .04 per cent., by weight. These several in gredients should be well mixed together, an then the compound will be ready for use.

What I claim is—

The combination of the several ingredient mentioned in the foregoing specification, i the proportions and for the purpose set forth

ISAAC HELLMAN.

Witnesses:
M. RANDOLPH,
A. WAGNER.